Feb. 23, 1971 C. S. ZEVAS ET AL 3,566,390
VISUAL INDICATOR FOR A DOORBELL
Filed June 3, 1968

INVENTORS
CONSTANTINE S. ZEVAS
RAYMOND J. KEAN
BY *Ullman Abbitt*

ATTORNEY

3,566,390
VISUAL INDICATOR FOR A DOORBELL
Constantine S. Zevas, Wayne, and Raymond J. Kean, Lake Hiawatha, N.J., assignors, by mesne assignments, to Sidney Osgood, Brooklyn, N.Y.
Filed June 3, 1968, Ser. No. 733,999
Int. Cl. G08b 5/22
U.S. Cl. 340—330     7 Claims

ABSTRACT OF THE DISCLOSURE

Solid state circuitry for providing a timed visual indication to a person upon actuation of a doorbell circuit including a light circuit switched by an SCR and a timing circuit controlling the SCR and connected to the doorbell circuit. An amplifier is interposed between the doorbell circuit and the timing circuit.

---

Figure 2:
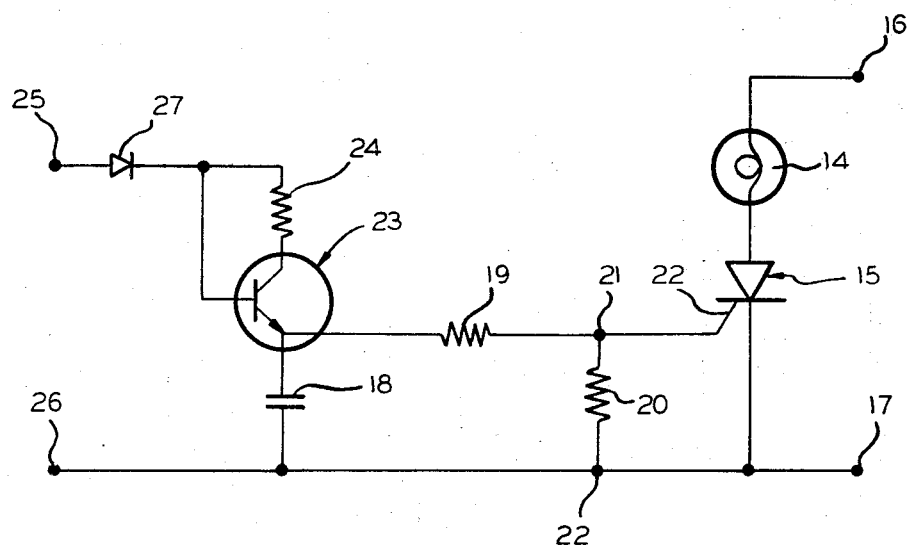

This invention relates in general to a visual indication apparatus for a doorbell circuit, and more particularly to an apparatus for providing a timed visual indication to a person upon the actuation of a doorbell circuit.

The present invention is intended to be utilized for a deaf or hard of hearing person to indicate to such a person that the doorbell of his residence is being rung by someone. The apparatus provides visual indication for a period of fifteen to twenty-five seconds or even longer after the doorbell has been rung by someone. The functioning of the apparatus is not at all dependent upon how long the doorbell is rung, and will function even though the doorbell is lightly rung.

The apparatus of the present invention includes a light circuit that is switched on for a period of time and maintained on by a timing circuit. The timing circuit is energized by the bell coil of the doorbell circuit. In order to positively energize the timing circuit, an amplifier is provided between the bell coil and the timing circuit. A silicon controlled rectifier is provided in the lght circuit and turned on to conduct upon energization of the timing circuit.

Accordingly, it is an object of the present invention to provide an apparatus for displaying a visual signal when the doorbell of a dwelling is rung.

Another object of this invention is in the provision of an apparatus for providing a timed visual indication to a deaf or hard of hearing person that his doorbell is being rung by someone, and which such indication is not dependent upon how long the doorbell is rung.

Figure 1:
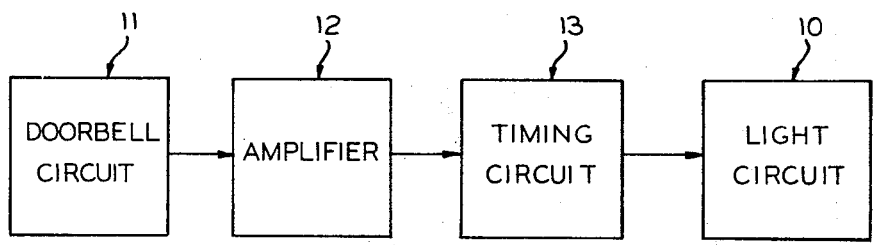

Other objects, features and advantages of the invention will be apparent from the following detailed disclosure, taken in conjunction with the accompanying sheet of drawing, wherein like reference numerals refer to like parts, in which:

FIG. 1 is a block diagram illustrating the indication apparatus of the present invention; and FIG. 2 is a schematic electrical diagram of the visual indication apparatus according to the present invention.

Referring now to the drawings and particularly to FIG. 1, the present invention includes a light circuit 10 adapted to provide visual indication to a person upon energization of a doorbell circuit 11. The signal from the doorbell circuit is amplified by an amplifier 12 and fed into a timing circuit 13 that controls the light circuit 10 and maintains the light circuit energized for a predetermined period of time.

The light circuit 10 includes a suitable lamp 14 in series with the anode and cathode of a silicon controlled rectifier 15, and a suitable voltage source across the points 16 and 17. The voltage source may be the usual household 120 volt A.C. voltage. Inasmuch as the silicon controlled rectifier 15 will permit current flow in only one direction, the lamp 14 may be somewhat dim when operated from an A.C. voltage.

The timing circuit 13 includes a condenser 18 parallel connected with serially connected resistors 19 and 20. A common point 21 for the resistors 19 and 20 is connected to the gate 22 of the silicon controlled rectifier 15, while a common point 22 for the condenser 18 and the resistor 20 is connected to the cathode of the silicon controlled rectifier 15. The timing circuit including the condenser 18 and the resistors 19 and 20, when energized, fires the silicon controlled rectifier 15 to permit current to flow in the light circuit and the energization of the lamp 14 for a predetermined period of time.

The amplifier 12 includes an NPN transistor 23 having its emitter connected in common with the condenser 18 and the resistor 19. A collector current limit resistor 24 is connected across the base and collector of the transistor 23. The input lines 25 and 26 are connected across the bell coil of the doorbell circuit 11. In order to properly drive the transistor 23 with D.C. power, a rectifying diode 27 is provided along one of the lines 25 and connected in common to the resistor 24 and the base of the transistor 23.

In operation, energization of the doorbell circuit delivers a signal to the transistor 23 which amplifies same and delivers it to the timing circuit to charge the condenser 18. Inasmuch as the condenser 18 cannot discharge back through the transistor, it discharges through the resistors 19 and 20 and the gate 22 on the silicon controlled rectifier and allows current to flow and energize the light circuit 10. The condenser will discharge at a rate dependent upon the value of the condenser to maintain the silicon controlled rectifier conducting for a predetermined period of time after the doorbell has been rung. Even if the doorbell circuit is lightly energized, the transistor 23 of the amplifier will pick up the signal and amplify same to energize the timing circuit. The silicon controlled rectifier 15 will continue conducting until the current being discharged from the condenser 18 will drop below the point of conduction of the gate 22.

It will be understood that modifications and variations may be effected without departing from the scope of the novel concepts of the present invention, but it is understood that this application is to be limited only by the scope of the appended claims.

The invention is hereby claimed as follows:

1. Apparatus for providing a timed visual indication to a person upon actuation of a dorbell circuit having a bell coil comprising, a light circuit including a lamp connected in series with a voltage source and the anode and cathode of a silicon controlled rectifier, a timing circuit having its input connected to said bell coil to respond to energization of the bell coil and an output connected to the gate and cathode of the silicon controlled rectifier, said timing circuit having means for quickly charging and slowly discharging to cause conduction in the silicon controlled rectifier and energization of the light circuit for a predetermined period of time to maintain said light circuit energized for said predetermined period of time, and means between the bell coil and the input to the timing circuit for preventing said discharging means from discharging through the bell coil.

2. Apparatus as defined in claim 1, wherein said timing circuit includes a condenser connected in parallel with a pair of serially connected resistors.

3. Apparatus as defined in claim 1, wherein said last-named means includes a transistor.

4. Apparatus for providing a timed visual indication upon actuation of a doorbell circuit having a bell coil comprising, a light circuit including a lamp connected in series with a voltage source and the anode and cathode of a silicon controlled rectifier, a timing circuit including a condenser connected in parallel with first and second serially connected resistors, means connecting the common point of the resistors to the gate of the silicon controlled rectifier, means connecting the common point of the second resistor and the condenser to the cathode of the silicon controlled rectifier, and an amplifier between said bell coil and the input to said timing circuit.

5. Apparatus as defined in claim 4, wherein said amplifier includes a transistor having its emitter connected to the common point of said condenser and first resistor and its collector and base connected in common to one side of said bell coil, and means connecting the other side of said bell coil to the common point of said condenser and second resistor.

6. Apparatus as defined in claim 5, and a diode connected betwen the base and collector of said transistor and one side of the bell coil to provide D.C. voltage to said transistor.

7. Apparatus as defined in claim 6, and a current limiting resistor connected between the base and collector of said transistor.

References Cited

UNITED STATES PATENTS

| | | | |
|---|---|---|---|
| 2,264,680 | 12/1941 | Roper | 340—330 |
| 3,320,473 | 5/1967 | Grafham | 307—252X |

DONALD J. YUSKO, Primary Examiner

M. SLOBASKY, Assistant Examiner

U.S. Cl. X.R.

307—252; 315—136